US010154199B2

(12) United States Patent
Son et al.

(10) Patent No.: US 10,154,199 B2
(45) Date of Patent: Dec. 11, 2018

(54) METHOD AND APPARATUS FOR SELF CAMERA SHOOTING

(71) Applicant: Samsung Electronics Co., Ltd., Gyeonggi-do (KR)

(72) Inventors: Ju-Hyoung Son, Suwon-si (KR); Soon-Mi Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/702,557

(22) Filed: May 1, 2015

(65) Prior Publication Data

US 2015/0237263 A1  Aug. 20, 2015

Related U.S. Application Data

(63) Continuation of application No. 13/678,350, filed on Nov. 15, 2012, now Pat. No. 9,041,847.

(30) Foreign Application Priority Data

Nov. 17, 2011 (KR) ........................ 10-2011-0120039

(51) Int. Cl.
*H04N 5/232* (2006.01)
*H04N 5/222* (2006.01)

(52) U.S. Cl.
CPC ..... *H04N 5/23293* (2013.01); *H04N 5/23245* (2013.01)

(58) Field of Classification Search
CPC ........... G06K 9/00335; G06K 9/00342; G06K 9/00355; G06K 9/00221; G06F 3/00; G06F 3/017; H04N 1/00381; H04N 5/23219

(Continued)

(56) References Cited

U.S. PATENT DOCUMENTS 8,819,555 B2 * 8/2014 Friedlander ........ H04N 21/4314
715/716
2004/0178995 A1 * 9/2004 Sterling .................. G06F 3/044
345/173

(Continued)

FOREIGN PATENT DOCUMENTS

CN       1694468 A    11/2005
EP     2 328 342 A1    6/2011

(Continued)

OTHER PUBLICATIONS

Office Action dated Jan. 9, 2013 in connection with Korean Patent Application No. 10-2011-0120039.

(Continued)

*Primary Examiner* — Chia Wei A Chen

(57) ABSTRACT

An apparatus capable of taking a self-portrait picture includes a screen, a camera, and a controller configured to cause the screen to display a live preview image received from the camera, after the live preview image is displayed, detect a first user gesture for triggering a display of an indicator on the screen, cause the screen to display the indicator at a changeable position where the first user gesture is detected, wherein the indicator indicates that a gesture detection mode is entered to recognize a second user gesture different from the first user gesture, while the indicator is displayed on the screen, detect the second user gesture in the indicator, and after detecting the second user gesture, cause the camera to automatically take a self-portrait picture.

21 Claims, 8 Drawing Sheets

(58) Field of Classification Search
USPC .................................................. 348/211.99
See application file for complete search history.

(56) References Cited

U.S. PATENT DOCUMENTS

| | | | |
|---|---|---|---|
| 2005/0057677 A1 | 3/2005 | Hagiwara et al. | |
| 2005/0245295 A1 | 11/2005 | Lee et al. | |
| 2007/0075968 A1* | 4/2007 | Hall | G06F 3/046 345/157 |
| 2007/0130582 A1* | 6/2007 | Chang | G06F 3/0346 725/37 |
| 2008/0052643 A1* | 2/2008 | Ike | G06F 3/017 715/863 |
| 2008/0084398 A1 | 4/2008 | Ito et al. | |
| 2008/0141181 A1* | 6/2008 | Ishigaki | G06F 3/011 715/863 |
| 2008/0239104 A1 | 10/2008 | Koh | |
| 2009/0079844 A1 | 3/2009 | Suzuki | |
| 2009/0265664 A1 | 10/2009 | Shin | |
| 2010/0013943 A1* | 1/2010 | Thorn | H04N 5/232 348/222.1 |
| 2010/0020221 A1 | 1/2010 | Tupman et al. | |
| 2010/0026830 A1 | 2/2010 | Kim | |
| 2010/0245287 A1 | 9/2010 | Thorn | |
| 2011/0080470 A1* | 4/2011 | Kuno | G06F 3/017 348/46 |
| 2011/0085016 A1* | 4/2011 | Kristiansen | G06F 3/04883 348/14.03 |
| 2011/0107216 A1 | 5/2011 | Bi | |
| 2011/0128397 A1 | 6/2011 | Kang | |
| 2011/0128431 A1 | 6/2011 | Bang | |
| 2011/0131610 A1* | 6/2011 | Lee | H04N 21/234318 725/48 |
| 2011/0193809 A1 | 8/2011 | Walley et al. | |
| 2011/0320949 A1* | 12/2011 | Ohki | G06F 17/245 715/727 |
| 2012/0026083 A1* | 2/2012 | Okada | G06F 3/017 345/156 |
| 2012/0036433 A1* | 2/2012 | Zimmer | G06T 15/20 715/702 |
| 2012/0081592 A1 | 4/2012 | Lim | |
| 2012/0200761 A1 | 8/2012 | Lim et al. | |
| 2012/0242852 A1 | 9/2012 | Hayward et al. | |
| 2012/0268376 A1* | 10/2012 | Bi | G06F 3/0425 345/168 |
| 2013/0283202 A1* | 10/2013 | Zhou | G06F 3/017 715/781 |

FOREIGN PATENT DOCUMENTS

| | | |
|---|---|---|
| JP | 2001028046 A | 1/2001 |
| JP | 2010183160 A | 8/2010 |
| KR | 10-2006-0019401 | 3/2006 |
| KR | 10-2010-0008936 | 1/2010 |
| KR | 10-2010-0095231 A | 8/2010 |
| KR | 10-2011-0054770 A | 5/2011 |
| KR | 10-2011-0088914 A | 8/2011 |
| KR | 10-2011-0105059 A | 9/2011 |

OTHER PUBLICATIONS

Notice of Patent Grant dated Sep. 2, 2013 in connection with Korean Patent Application No. 10-2011-0120039.
Translated Chinese Office Action dated Apr. 3, 2015 in connection with Chinese Patent Application No. 201210460138.0; 11 pages.

* cited by examiner

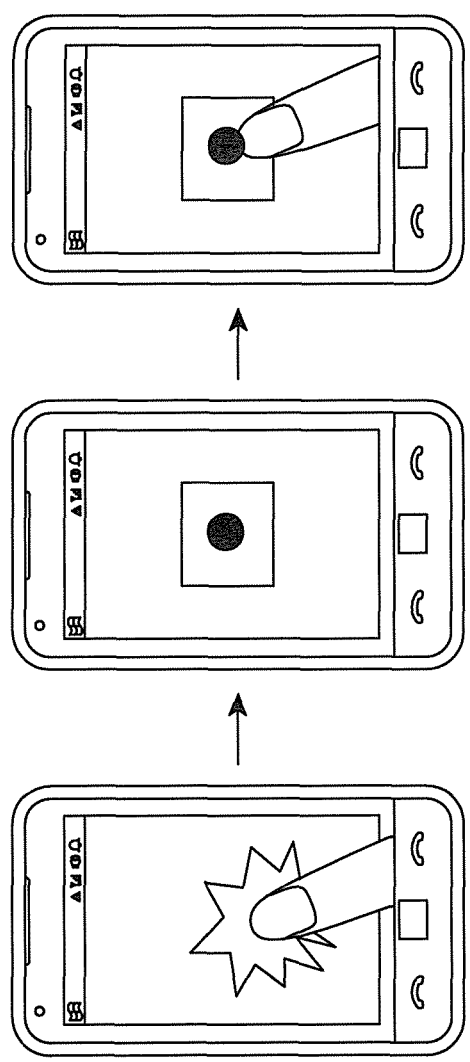

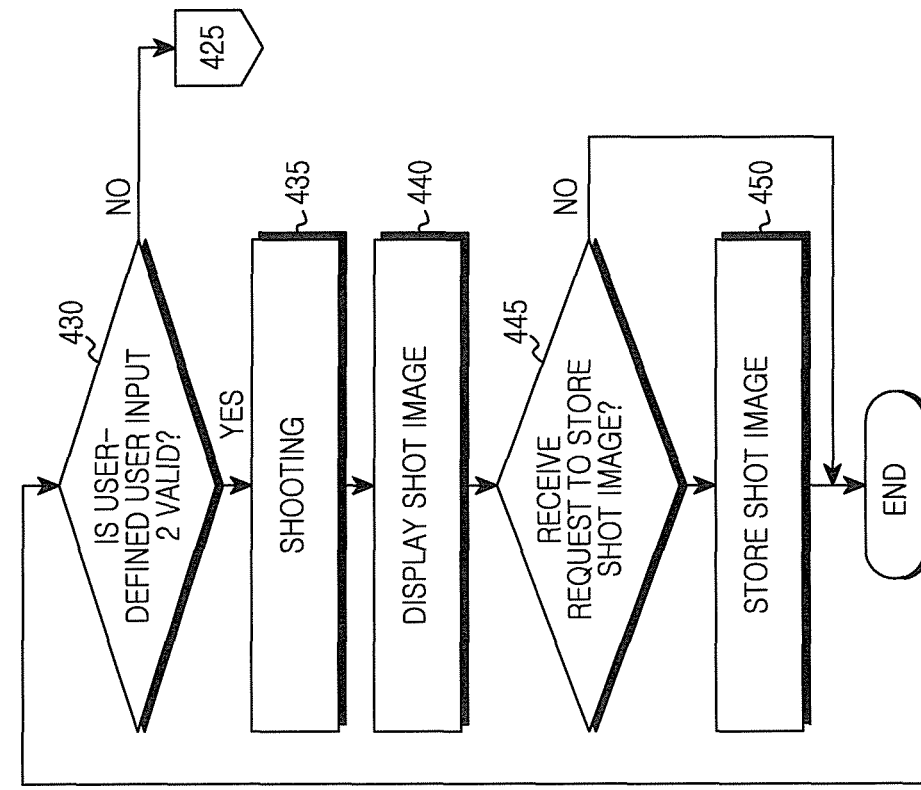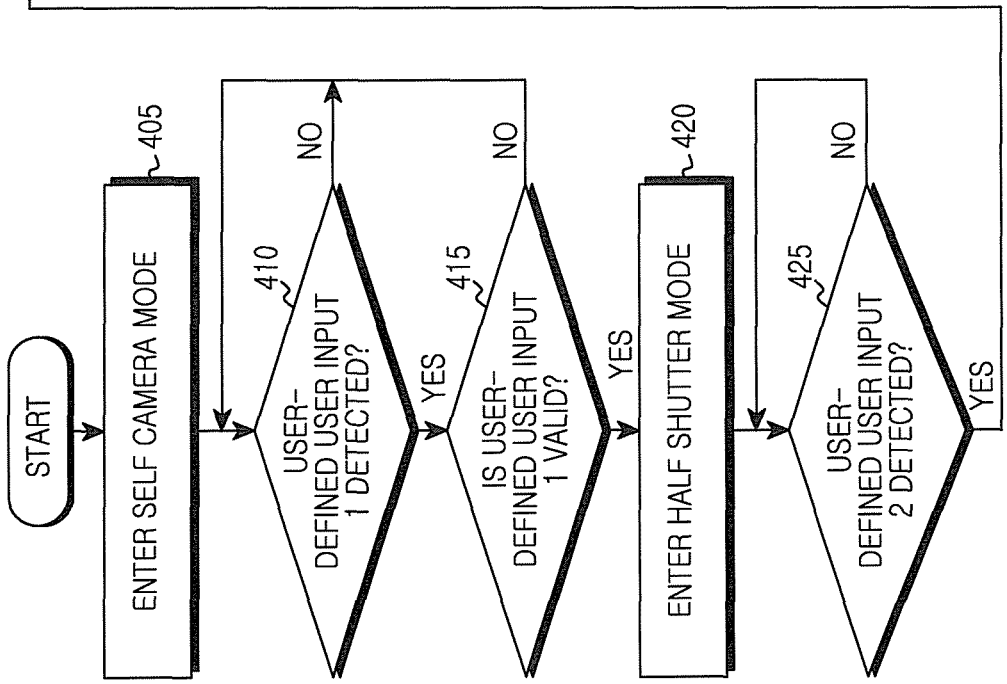
FIG.4

METHOD AND APPARATUS FOR SELF CAMERA SHOOTING

CROSS-REFERENCE TO RELATED APPLICATION AND CLAIM OF PRIORITY

This application is a continuation of U.S. patent application Ser. No. 13/678,350, filed Nov. 15, 2012 which claims priority to Korea Patent No. 10-2011-0120039, filed Nov. 17, 2011, and is incorporated herein by reference into this disclosure as if fully set forth herein.

TECHNICAL FIELD

The present disclosure relates to a self-camera image capturing, and specifically, to a method and an apparatus for enabling a self-camera image capturing.

BACKGROUND

A recent mobile terminal has a camera basically and supports an image capturing function using the camera.

To perform the image capturing, a user presses a key button of a mobile terminal or touches a button on a touch screen.

However, in the example where a user touches a button on a screen to perform the image capturing, as the user touches the button with his thumb generally, a hand gripping the mobile terminal may shake or the hand's posture may be unstable during the image capturing. This issue becomes more serious during the self-camera image capturing.

In addition, in the example where a user presses a key of the mobile terminal to perform the camera image capturing, since the key is positioned at a certain position, one of a left-handed user and a right-handed user has inconvenience.

SUMMARY

To address the above-discussed deficiencies of the prior art, it is a primary object to provide at least the advantages described below. Accordingly, an aspect of the present disclosure is to provide a method and an apparatus for the self-camera image capturing.

Another aspect of the present disclosure is to provide a method and an apparatus for allowing a user to conveniently take a picture in the self-camera image capturing mode.

Still another aspect of the present disclosure is to provide an apparatus and a method for providing a user input comprising a pre-determined pattern on a screen for taking a self-portrait image capturing so that a user can and perform the image capturing. Yet another aspect of the present disclosure is to provide an apparatus and a method for providing a user input comprising a pre-determined pattern on a screen for taking a self-portrait picture in a stable manner.

Yet further another aspect of the present disclosure is to provide an apparatus and method for providing a user input comprising a configurable pattern, on a screen, for taking a self-portrait picture.

Yet another aspect of the present disclosure is to provide an apparatus and a method for providing a user input comprising a pattern configured by the user for taking a self-portrait picture.

Yet further another aspect of the present disclosure is to provide an apparatus and a method in which a user freely decides a position of a pop-up for image capturing in the self-camera mode so that a user can enter a user input with respect to the pop-up conveniently.

In accordance with an aspect of the present disclosure, a method for the self-camera image capturing in a mobile terminal is provided. The method includes determining whether a first user input is detected, when the first user input is detected, entering a half shutter mode, determining whether a second user input is detected, and when the second user input is detected, performing the self-camera image capturing.

In accordance with another aspect of the present disclosure, an apparatus of a mobile terminal performing the self-camera image capturing is provided. The apparatus includes a camera for the self-camera image capturing, an input unit for detecting a user input, and a controller for determining whether a first user input is detected, when the first user input is detected, entering a half shutter mode, determining whether a second user input is detected, and when the second user input is detected, performing the self-camera image capturing.

Other aspects, advantages and salient features of the invention will become apparent to those skilled in the art from the following detailed description, which, taken in conjunction with the annexed drawings, discloses example embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A-C illustrate a user input operation for allowing a user to perform a self-camera image capturing conveniently and stably in a mobile terminal according to another example embodiment of the present disclosure;

FIG. 4 illustrates another flow chart for enabling a user to perform a self-camera image capturing conveniently and stably in a mobile terminal according to another example embodiment of the present disclosure;

Throughout the drawings, like reference numerals will be understood to refer to like parts, components and structures.

DETAILED DESCRIPTION OF EXEMPLARY EMBODIMENTS

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of example embodiments of the invention as defined by the claims and their equivalents. It includes various specific details to assist in that understanding but these are to be regarded as merely example. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of example embodiments of the present invention are provided for illustration purpose only and not for the purpose of limiting the invention as defined by the appended claims and their equivalents.

More particularly, the present disclosure relates to a method and an apparatus for enabling to take a self-portrait picture via a predetermined user input instead of inputting an exclusive button for taking a self-portrait picture.

Hereinafter, a method and an apparatus for a self-camera image capturing are described. Though a self-camera image capturing indicates a self-portrait image capturing, the present disclosure is applicable to other general camera image capturing. A user input in the present disclosure includes both a user's touch and a user's input other than the user's touch.

Figure 1A:
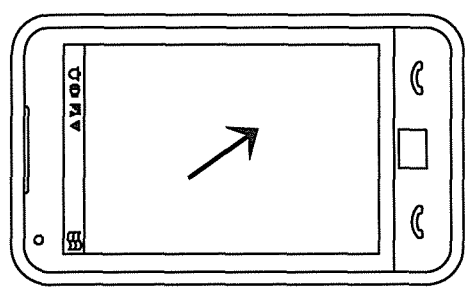
FIGS. 1A-C illustrate a user input operation for allowing a user to perform a self-camera image capturing conveniently and stably in a mobile terminal according to an example embodiment of the present disclosure.
Figure 1B:
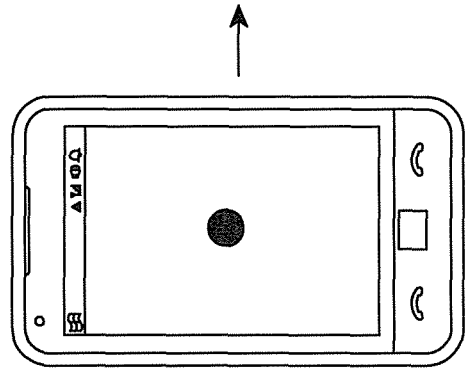
Figure 1C:
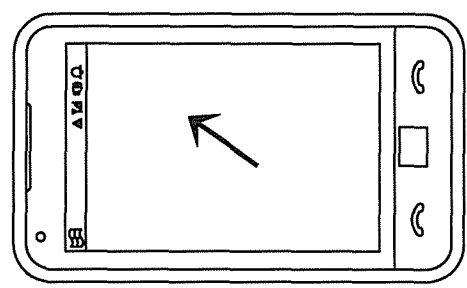

FIGS. 1A-C illustrate a user input operation for enabling a user to perform the self-camera image capturing conveniently and stably in a mobile terminal according to an example embodiment of the present disclosure.

Referring to FIGS. 1A-C, a special key for the self-camera image capturing is not provided. Instead, when a specific user input is detected on a preview screen, the image capturing is performed.

That is, when a user performs a certain motion on a preview screen with his finger, the image capturing is performed. In FIGS. 1A-C, the certain motion is "V". The certain motion in FIGS. 1A-C can be designated by the user. In addition, a user-designated certain motion setting is performed via an exclusive menu provided to the mobile terminal, and the user performs the certain motion on a touch screen of the mobile terminal to configure the certain motion.

First, in FIG. 1A, the user takes a posture for the self-camera image capturing, and enters a user input in a lower diagonal direction in order to input "V" on the screen, that is, the preview screen.

After that, in FIG. 1B, the user touches his/her finger on the screen, that is, the preview screen, and stands by for a predetermined time. The predetermined time is for improving the accuracy of "V" input recognition. At this point, the camera enters a half shutter mode.

After that, in FIG. 1C, the user performs an input in an upper diagonal direction in order to complete an input "V" on the screen, that is, the preview screen. Then, the camera image capturing is performed.

FIGS. 2A-C is a second view illustrating a user input operation for enabling a user to perform the self-camera image capturing conveniently and stably in a mobile terminal according to another example embodiment of the present disclosure.

Referring to FIGS. 2A-C, a special key for the self-camera image capturing is not provided. Instead, when a certain user input is detected on a preview screen, the image capturing is performed.

In FIGS. 2A-C, when a user enters a user input on the preview screen (FIG. 2A), a popup menu appears (FIG. 2B). The popup menu is shown on a popup. When the user provides a user input to the popup, a picture is taken (FIG. 2C).

That is, the popup can be located on a position where a user can provide a user input conveniently.

Figure 3:
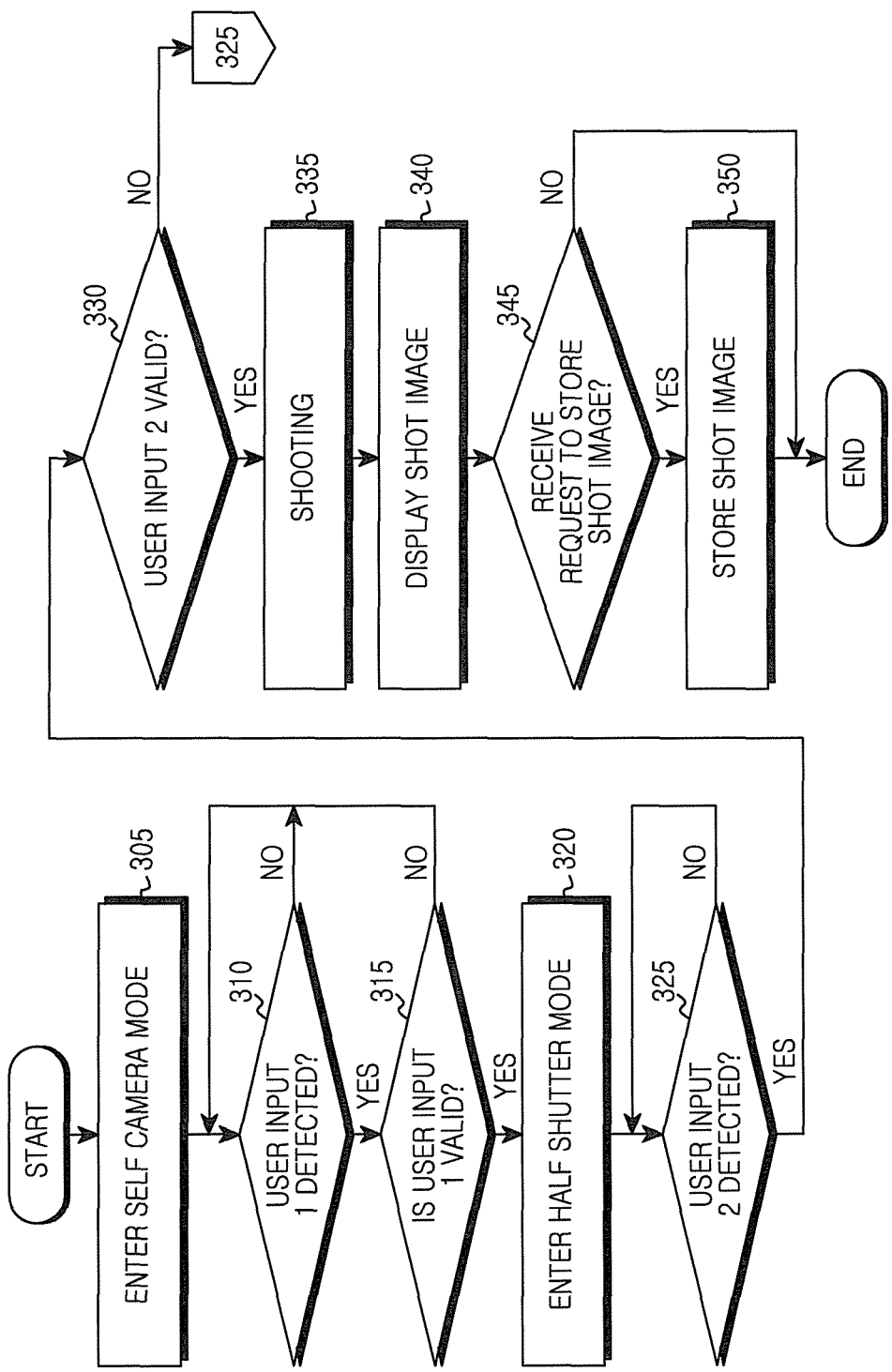
FIG. 3 illustrates a flow chart for enabling a user to perform a self-camera image capturing conveniently and stably in a mobile terminal according to an example embodiment of the present disclosure.

FIG. 3 illustrates a process for allowing a user to take a self-portrait picture conveniently and stably in a mobile terminal according to an example embodiment of the present disclosure.

Referring to FIG. 3, when the mobile terminal enters a self-portrait image capturing mode (step 305) and then detects a user input 1 (step 310), the mobile terminal determines the validity of the user input 1 (step 315). An example of determining the validity of the user input 1 is described below.

A step of determining whether the user input 1 is valid can include determining whether the position (ex: x, y coordinates) of a user input and the length of the user input in FIG. 1A are between respective upper and lower thresholds, and determining whether the standby time shown in FIG. 1B is between another upper and lower thresholds. In addition, the upper threshold and the lower threshold can be set by the user beforehand or can be a predetermined value. Alternatively, an algorithm for determining the validity of the user input 1 can be a generally suitable known algorithm.

When the user input 1 is valid (step 315), the mobile terminal enters a half shutter mode (step 320).

When the user input 1 is not detected (step 310) or the user input 1 is not valid (step 315), the mobile terminal monitors whether the user input 1 is detected again (step 310).

After that, when the mobile terminal detects a user input 2 (step 325), the mobile terminal determines whether the user input 2 is valid (step 330).

A step of determining whether the user input 2 is valid can include determining whether the position (x, y coordinates) of a user input and the length of the user input in FIG. 1C are between respective upper and lower thresholds. In addition, the upper and lower thresholds can be configured by the user beforehand or can be a predetermined value. Alternatively, an algorithm for determining the validity of the user input 2 can adopt any generally known suitable algorithm.

When the user input 2 is valid (step 330), the mobile terminal takes a picture (step 335).

When the user input 2 is not detected (step 325) or the user input 2 is not valid (step 330), the mobile terminal monitors whether the user input 2 is detected again (step 325).

After that, the mobile terminal displays a taken image (i.e., an image captured by the mobile terminal) (step 340), and when an instruction to store the taken image is received from the user (step 345), the mobile terminal stores the taken image (step 350).

FIG. 4 illustrates a process for allowing a user to take a self-portrait picture conveniently and stably in a mobile terminal according to another example embodiment of the present disclosure.

Referring to FIG. 4, when the mobile terminal enters a self-portrait image capturing mode (step 405) and then detects a user-defined user input 1 (step 410), the mobile terminal determines whether the user-defined user input 1 is valid (step 415).

Here, the user-defined user input 1 indicates a user input pattern defined by the user. When the user-defined user input 1 is valid (step 415), the mobile terminal enters a half-shutter mode (step 420).

When the user-defined user input 1 is not detected (step 410), or the user-defined user input 1 is not valid (step 415), the mobile terminal monitors whether the user-defined user input 1 is detected again (step 410).

After that, when the mobile terminal detects a user-defined user input 2 (step 425), the mobile terminal determines whether the user-defined user input 2 is valid (step 430).

Here, the user-defined user input 2 indicates a user input pattern defined by the user.

An algorithm for determining whether the user-defined user input 1 and the user-defined user input 2 are valid can be the algorithm described in association to FIG. 3, or any other generally known suitable algorithm.

When the user-defined user input 2 is valid (step 430), the mobile terminal takes a picture (step 435).

When the user-defined user input 2 is not detected (step 425), or the user-defined user input 2 is not valid (step 430), the mobile terminal monitors whether the user-defined user input 2 is detected again (step 425).

After that, the mobile terminal displays a taken image (i.e., an image taken by the mobile terminal) (step 440) and when an instruction to store the taken image is received from the user (step 445), the mobile terminal stores the taken image (step 450).

Figure 5:
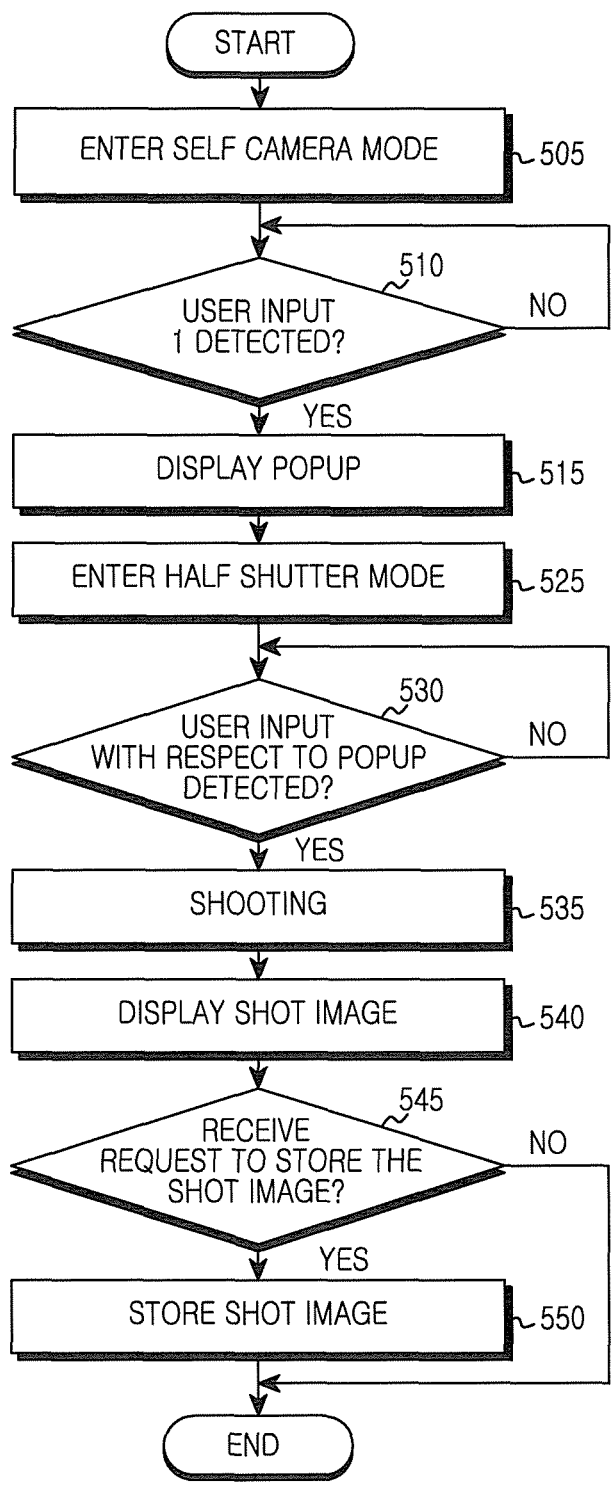
FIG. 5 illustrates yet another flow chart for enabling a user to perform a self-camera image capturing conveniently and stably in a mobile terminal according to still another example embodiment of the present disclosure.

FIG. 5 illustrates a process for allowing a user to perform a self-camera image capturing conveniently and stably in a mobile terminal according to still another example embodiment of the present disclosure.

Referring to FIG. 5, when the mobile terminal enters a self-camera image capturing mode (step 505) and then detects a user input 1 on a screen (step 510), the mobile terminal displays a popup (step 515). Here, the popup locates at a position at which the user entered a user input on the screen.

After that, the mobile terminal enters a half shutter mode (step 525).

Then, when detecting a user input with respect to the popup (step 530), the mobile terminal takes a picture (step 535).

When not detecting the user input with respect to the popup (step 530), the mobile terminal monitors whether a user input with respect to the popup is detected again.

After that, the mobile terminal displays a taken image (i.e., an image taken by the mobile terminal) (step 540), and a command to store the taken image is received from the user (step 545), the mobile terminal stores the taken image (step 550).

Figure 6:
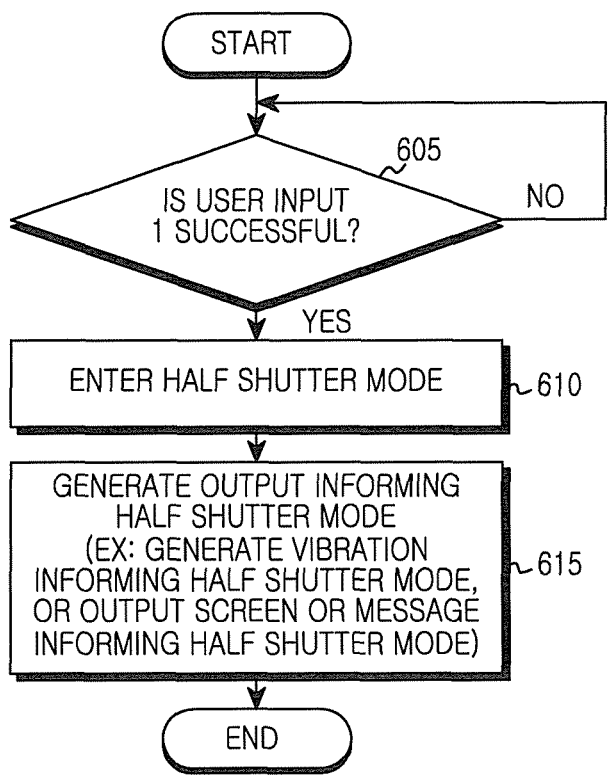
FIG. 6 illustrating a process for notifying a half shutter mode according to an example embodiment of the present disclosure.

FIG. 6 illustrates a process for indicating a half shutter mode according to an example embodiment of the present disclosure.

Referring to FIG. 6, when successfully detecting the user input 1, the mobile terminal enters a half shutter mode. In this example, when the mobile terminal informs the user using the mobile terminal of that the mobile terminal enters the half shutter mode, more convenience can be provided to the user.

When successfully detecting the user input 1 (step 605), the mobile terminal enters the half shutter mode (step 610) and generates a half shutter mode output informing that the mobile terminal enters the half shutter mode (step 615).

The half shutter mode can be notified by voice or sounds, vibration, or a message on a screen.

In addition, the half shutter mode can be notified by a blinking of a Light Emitting Diode (LED) provided to the mobile terminal, or a blinking of a flash provided to the mobile terminal, which do not limit to the scope of the invention.

Figure 7:
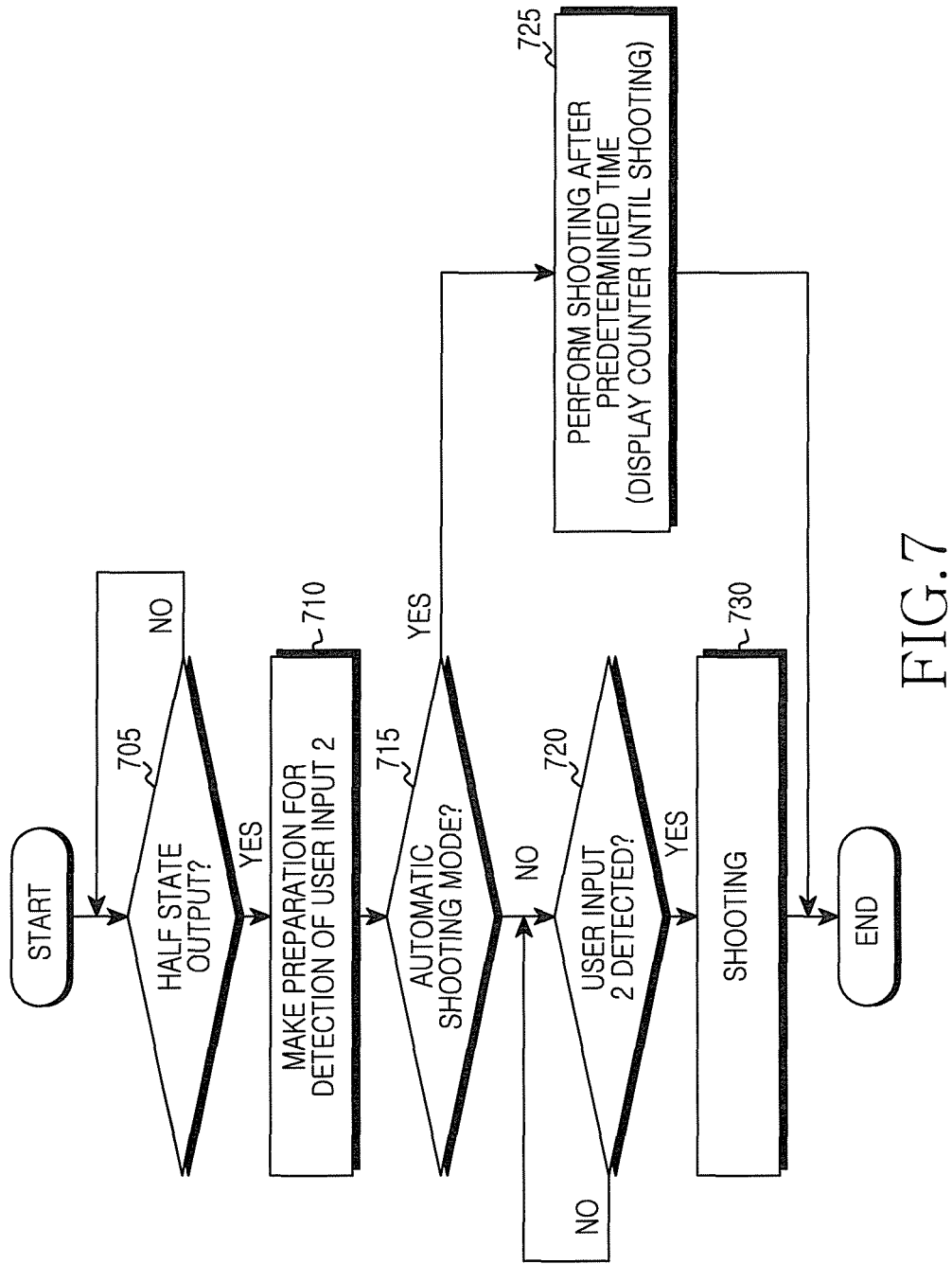
FIG. 7 illustrating a process for the image capturing by a detection of a second user input since a half shutter mode according to an example embodiment of the present disclosure.

FIG. 7 illustrates a process for the image capturing by a detection of a user input 2 in a half shutter mode according to an example embodiment of the present disclosure.

Referring to FIG. 7, after outputting the half shutter mode (step 705), the mobile terminal makes a preparation for a detection of the user input 2 (step 710). The preparation for the detection of the user input 2 includes determining whether a process for detecting the user input 2 is configured to adopt an automatic image capturing mode.

When the automatic image capturing mode is adopted (step 715), the mobile terminal automatically performs the camera image capturing in a predetermined time (step 725). In this example, a counter time remaining until taking a picture can be displayed.

When the automatic picture taking mode is not configured (step 715), the mobile terminal determines whether the user input 2 is detected (step 720).

When detecting the user input 2 (step 720), the mobile terminal performs a camera image capturing (step 730).

The processes after this are the same as the above-described processes (ex: store a taken image).

When detecting the user input 2, instead of the user's operation of providing the user input on the screen of the mobile terminal, the mobile terminal determines whether predetermined voice or sound is detected, and when the predetermined voice or sound is detected, the mobile terminal can determine that the user input 2 has been detected.

In addition, when detecting the user input 2, the mobile terminal determines whether the user's specific gesture is input, and when the certain gesture is detected, the mobile terminal can determine that the user input 2 has been detected.

Figure 8:
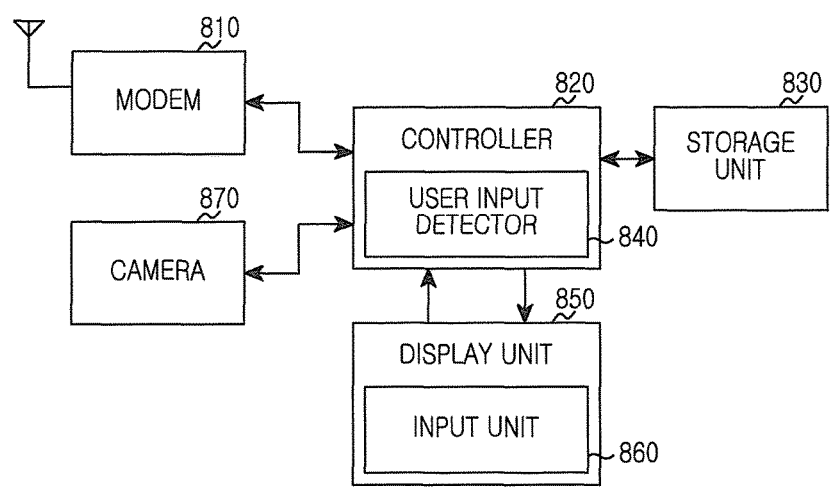
FIG. 8 illustrates a block diagram a mobile terminal enabling a user to perform a self-camera image capturing conveniently and stably according to an example embodiment of the present disclosure.

FIG. 8 illustrates a mobile terminal allowing a user to perform the self-camera image capturing conveniently and stably according to an example embodiment of the present disclosure.

Referring to FIG. 8, the mobile terminal includes a modem 810, a controller 820, a storage unit 830, a user input detector 840, a display unit 850, an input unit 860, and a camera 870. The controller 820 controls the user input detector 840. In addition, the user input detector 840 performs the self-camera image capturing using the camera 870.

The modem 810 serves as a module for communicating with other apparatuses, and includes a radio processor, a baseband processor, etc. The radio processor converts a signal received via an antenna into a baseband signal to provide the same to the baseband processor, and converts a baseband signal from the baseband processor into a Radio Frequency (RF) signal so that the signal can be transmitted on an actual RF path, to transmit the same via the antenna.

All types of RF communication protocols currently in use can be used as an RF communication protocol used by the modem. The controller 820 controls an overall operation of the mobile terminal, and more particularly, controls the user input detector 840 according to the present disclosure.

The storage unit 830 stores a program for controlling an overall operation of the mobile terminal and temporary data generated during execution of the program. Particularly, the storage unit 830 stores a taken or generated image according to an example embodiment of the present disclosure.

The display unit 850 displays an output of the controller 820, and can be a Liquid Crystal Display (LCD), for example.

The input unit 860 serves as a unit for receiving a user input, and is positioned on the display unit 850, and feeds the user input to the controller 820.

When the mobile terminal enters a self-camera image capturing mode and then detects the user input 1, the user input detector 840 determines whether the user input 1 is valid.

A step of determining whether the user input 1 is valid can include determining whether the position (ex: x, y coordinates) of a user input and the length of the user input in FIG. 1A is within the upper and lower thresholds, and determining whether the standby time in FIG. 1B is between the upper and lower thresholds. The upper threshold and the lower threshold can be configured by the user in advance or can be a predetermined value.

When the user input 1 is valid, the user input detector 840 enters a half shutter mode.

When the user input 1 is not detected, or the user input 1 is not valid, the user input detector 840 monitors whether the user input 1 is detected again.

After that, when detecting the user input 2, the user input detector 840 determines whether the user input 2 is valid. A step of determining whether the user input 2 is valid can include determining whether the position (x, y coordinates) of a user input and the length of the user input in FIG. 1C is between the upper and lower thresholds. Likewise, the upper thresholds and the lower thresholds can be set by the user in advance or can be a predetermined value. When the user input 2 is valid, the user input detector 840 takes a picture from a camera.

When the user input 2 is not detected, or the user input 2 is not valid, the user input detector 840 monitors whether the user input 2 is detected again.

After that, the user input detector 840 displays a taken image on the display unit 850, and when a user selects to store a taken image, the user input detector 840 stores the taken image in the storage unit 830.

After the mobile terminal enters a self-portrait picture mode, when detecting the user-defined user input 1, the user input detector 840 determines whether the user-defined user input 1 is valid. Here, the user-defined user input 1 is a user input pattern defined by the user. The position, the length, and the time of the user-defined user input 1, and the upper threshold and the lower threshold can be arbitrarily set by the user.

When the user-defined user input 1 is valid, the user input detector 840 enters a half shutter mode.

When the user-defined user input 1 is not detected, or the user-defined user input 1 is not valid, the user input detector 840 monitors whether the user-defined user input 1 is detected again.

After that, when detecting a user-defined user input 2, the user input detector 840 determines whether the user-defined user input 2 is valid. Here, the user-defined user input 2 is a user input pattern defined by the user. The position, and the length of the user-defined user input 2, and the upper threshold and the lower threshold can be arbitrarily set by the user.

When the user-defined user input 2 is valid, the user input detector 840 takes a picture from a camera.

When the user-defined user input 2 is not detected, or the user-defined user input 2 is not valid, the user input detector 840 monitors whether the user-defined user input 2 is detected again.

After that, the user input detector 840 displays a taken image on the display unit 850, and when a user selects to store the taken image, the user input detector 840 stores the taken image in the storage unit 830.

Alternatively, after the mobile terminal enters the self-camera mode, when the user input detector 840 detects a user input on the screen, the user input detector 840 displays a popup. Here, the popup locates at a position at which the user entered the user input on the screen.

After that, the user input detector 840 enters a half shutter mode (step 525).

After that, when detecting a user input with respect to the popup, the user input detector 840 performs the camera image capturing.

When not detecting the user input with respect to the popup, the user input detector 840 monitors whether the user input with respect to the popup is detected again.

After that, the mobile terminal displays a taken image on the display 850, and when a user determines to store the taken image, the mobile terminal stores the taken image in the storage unit 830.

When successfully detecting the user input 1, the user input detector 840 enters a half shutter mode. In this example, when the user input detector 840 informs the user who uses the mobile terminal that the user input detector 840 enters the half shutter mode, more convenience can be provided to the user.

That is, when successfully detecting the user input 1, the user input detector 840 enters a half shutter mode, and generates a half shutter mode notification informing that the user input detector 840 enters the half shutter mode.

Entering the half shutter mode can be notified by voice or sound, vibration, or a visual message on a screen.

In addition, entering the half shutter mode can be notified by a blinking of a Light Emitting Diode (LED) provided to the mobile terminal, or a blinking of a flash provided to the mobile terminal, which does not limit the scope of the invention.

After notifying of entering a half shutter mode, the user input detector 840 makes a preparation for detection of a user input 2. The preparation for the detection of the user input 2 includes determining whether a process for detecting the user input 2 is configured to adopt an automatic image capturing mode.

When the automatic image capturing mode is adopted, the user input detector 840 automatically takes a picture in a predetermined time. In this example, a counter showing a remaining time until taking a picture can be displayed.

When the automatic image capturing mode is not adopted, the user input detector 840 monitors whether the user input 2 is detected.

When detecting the user input 2, the user input detector 840 takes a picture from a camera.

The processes after this are the same as the above-described processes (ex: store a taken image).

When detecting the user input 2, instead of the user's operation of providing the user input on the screen of the mobile terminal, the user input detector 840 determines whether certain user's voice or sound is detected using an algorithm realized in advance, and when the certain user's voice or sound is detected, the user input detector 840 can determine that the user input 2 has been detected.

In addition, when detecting the user input 2, the mobile terminal determines whether the user's certain gesture is input, and when the certain gesture is detected, the mobile terminal can determine that the user input 2 has been detected.

The present disclosure allows a user to take a self-portrait picture in a stable posture, thereby providing a convenience to the user.

Although the invention has been shown and described with reference to certain example embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus capable of taking a self-portrait picture, comprising:
    a screen;
    a camera sensor; and
    at least one processor configured to:
        cause the screen to display a preview image received from the camera sensor;
        after the preview image is displayed, detect a first user gesture to trigger a display of an indicator on the screen;
        in response to detecting the first user gesture, cause the screen to display the indicator, superimposed over a portion of the preview image, at a changeable position where the first user gesture is detected, wherein the indicator indicates that a gesture detection mode is entered for recognizing a second user gesture different from the first user gesture;
        while the indicator is displayed on the screen, detect the second user gesture occurring in an area corresponding to where the indicator is displayed; and
        in response to detecting the second user gesture, cause the camera sensor to take a self-portrait picture.

2. The apparatus of claim 1, wherein the first user gesture comprises a first pre-configured pattern.

3. The apparatus of claim 2, wherein the first user gesture comprises a touchless input.

4. The apparatus of claim 2, wherein the first user gesture is determined to be valid when a position of the first pre-configured pattern is within a predetermined region on the screen.

5. The apparatus of claim 4, wherein the at least one processor is configured to cause the screen to display the indicator at the position when the first user gesture is determined to be valid.

6. The apparatus of claim 2, wherein the second user gesture comprises a second pre-configured pattern different from the first pre-configured pattern.

7. The apparatus of claim 6, wherein the second user gesture is determined to be valid when a position of the second pre-configured pattern is within a predetermined region on the screen.

8. The apparatus of claim 1, wherein the indicator indicates a region in which the second user gesture occurring in the indicator is determined to be valid.

9. The apparatus of claim 1, further comprising:
    a timer counter configured to cause the camera sensor to automatically take the self-portrait picture upon an expiration of the timer counter.

10. The apparatus of claim 9, wherein the at least one processor is configured to trigger the time counter in response to detecting the second user gesture.

11. A method for taking a self-portrait picture, the method comprising:
    displaying a preview image received from a camera sensor on a screen;
    after the preview image is displayed, detecting a first user gesture to trigger a display of an indicator on the screen;
    in response to detecting the first user gesture, displaying the indicator, superimposed over a portion of the preview image, at a changeable position where the first user gesture is detected, wherein the indicator indicates that a gesture detection mode is entered for recognizing a second user gesture different from the first user gesture;
    while the indicator is displayed on the screen, detecting the second user gesture in an area corresponding to where the indicator is displayed; and
    in response to detecting the second user gesture, taking a self-portrait picture.

12. The method of claim 11, wherein the first user gesture comprises a first pre-configured pattern.

13. The method of claim 12, wherein the first user gesture comprises a touchless input.

14. The method of claim 12, wherein the first user gesture is determined to be valid when a position of the first pre-configured pattern is within a predetermined region on the screen.

15. The method of claim 14, wherein displaying the indicator comprises displaying the indicator at the position when the first user gesture is determined to be valid.

16. The method of claim 12, wherein the second user gesture comprises a second pre-configured pattern different from the first pre-configured pattern.

17. The method of claim 16, wherein the indicator indicates a region in which the second user gesture occurring in the indicator is determined to be valid.

18. The method of claim 16, wherein the second user gesture is determined to be valid when a position of the second pre-configured pattern is within a predetermined region on the screen.

19. The method of claim 11, further comprising:
displaying a timer counter configured to cause the camera sensor to automatically take the self-portrait picture upon an expiration of the timer counter,
wherein the time counter is triggered in response to detecting the second user gesture.

20. An apparatus capable of taking a self-portrait picture, comprising:
a screen;
a camera sensor; and
at least one processor configured to:
cause the screen to display a preview image received from the camera sensor;
in response to detecting a user input, enter a gesture detection mode for recognizing a user input gesture at a changeable position on the screen, and
cause the screen to display an indicator, superimposed over a portion of the preview image, indicating the gesture detection mode being entered at a position in which the user input is detected;
while the indicator is displayed on the screen, detect the user input gesture in an area corresponding to where the indicator is displayed; and
in response to detecting the user input gesture, cause the camera sensor to take a self-portrait picture.

21. An apparatus capable of taking a self-portrait picture, comprising:
a screen;
a camera sensor; and
at least one processor configured to:
cause the screen to display a preview image received from the camera sensor;
after the preview image is displayed, detect a first user gesture to trigger a display of an indicator on the screen;
in response to detecting the first user gesture, cause the screen to display the indicator, superimposed over a portion of the preview image, at a changeable position where the first user gesture is detected, wherein the indicator indicates that a gesture detection mode is entered for recognizing a second user gesture different from the first user gesture;
while the indicator is displayed on the screen, detect the second user gesture occurring in an area corresponding to where the indicator is displayed; and
in response to detecting the second user gesture, cause a timer counter to automatically take, via the camera sensor, a self-portrait picture upon an expiration of the timer counter.

* * * * *